United States Patent
Hashimoto et al.

(10) Patent No.: US 11,738,650 B2
(45) Date of Patent: Aug. 29, 2023

(54) ABNORMALITY JUDGMENT APPARATUS, ABNORMALITY JUDGMENT SYSTEM, MOBILE OBJECT, AND ABNORMALITY JUDGMENT METHOD

(71) Applicant: TOYOTA JIDOSHA KABUSHIKI KAISHA, Aichi-ken (JP)

(72) Inventors: Toshiya Hashimoto, Miyoshi (JP); Daiki Yokoyama, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/743,454

(22) Filed: May 13, 2022

(65) Prior Publication Data

US 2022/0363147 A1 Nov. 17, 2022

(30) Foreign Application Priority Data

May 17, 2021 (JP) ................................. 2021-083076

(51) Int. Cl.
*H02J 50/12* (2016.01)
*H02J 50/40* (2016.01)
(Continued)

(52) U.S. Cl.
CPC ............... *B60L 53/12* (2019.02); *B60L 53/64* (2019.02); *B60L 53/65* (2019.02); *B60L 53/66* (2019.02);
(Continued)

(58) Field of Classification Search
CPC ........ B60L 50/53; B60L 53/12; B60L 53/122; B60L 53/60; B60L 53/62; B60L 53/63; B60L 53/64; B60L 53/65; B60L 53/66; B60L 53/67; B60L 53/68; H02J 50/10; H02J 50/12; H02J 50/40; H02J 50/80; H02J 50/90

See application file for complete search history.

(56) References Cited

U.S. PATENT DOCUMENTS

| | | | | |
|---|---|---|---|---|
| 2013/0119925 A1* | 5/2013 | Kawamura | ........... | H02J 7/0042 320/108 |
| 2013/0307471 A1* | 11/2013 | Ichikawa | ................ | B60L 53/36 320/108 |
| 2016/0355095 A1* | 12/2016 | Okamoto | ................ | B60L 50/51 |

FOREIGN PATENT DOCUMENTS

JP 2010167898 A 8/2010

\* cited by examiner

*Primary Examiner* — Levi Gannon
(74) *Attorney, Agent, or Firm* — HAUPTMAN HAM, LLP

(57) ABSTRACT

An abnormality judgment apparatus provided with a processing part, a communicating part able to communicate with a mobile object provided with a power reception apparatus receiving power wirelessly transmitted from a power transmission apparatus installed on a road, and a storage part storing power reception history information received from the mobile object. The processing part calculates a probability of occurrence of an abnormality in the power reception apparatus of the mobile object based on the power reception history information and detects a presence of an abnormality occurring location where the power transfer efficiency becomes less than a predetermined value and judges that an abnormality has occurred in the power transmission apparatus installed at the abnormality occurring location when an abnormality occurring location is detected and the probability becomes less than a predetermined judgment threshold value.

7 Claims, 4 Drawing Sheets

(51) Int. Cl.
*H02J 50/80* (2016.01)
*B60L 53/12* (2019.01)
*B60L 53/64* (2019.01)
*B60L 53/65* (2019.01)
*B60L 53/67* (2019.01)
*B60L 53/66* (2019.01)

(52) U.S. Cl.
CPC .............. *B60L 53/67* (2019.02); *H02J 50/12* (2016.02); *H02J 50/40* (2016.02); *H02J 50/80* (2016.02)

ABNORMALITY JUDGMENT APPARATUS, ABNORMALITY JUDGMENT SYSTEM, MOBILE OBJECT, AND ABNORMALITY JUDGMENT METHOD

RELATED APPLICATIONS

The present application claims priority of Japanese Patent Application No. 2021-083076 filed May 17, 2021, the disclosure of which is hereby incorporated by reference herein in its entirety.

FIELD

The present disclosure relates to an abnormality judgment apparatus, abnormality judgment system, mobile object, and abnormality judgment method.

BACKGROUND

Japanese Unexamined Patent Publication No. 2010-167898 discloses a vehicle configured to enable charging of a battery by dynamic wireless power transfer.

SUMMARY

When an abnormality occurs in power transfer from a power transmission apparatus to a power reception apparatus, a dynamic wireless power transfer system has to judge if the cause of the abnormality lies in the power transmission apparatus installed on the road or if it lies in the power reception apparatus mounted in a vehicle. In particular if the abnormality occurs in the power transmission apparatus, all of the vehicles running on an electrified road at which the power transmission apparatus where the abnormality occurs are affected. That is, if an abnormality occurs in a power transmission apparatus, its effect extends over a broad range. For this reason, it is desirable to enable an abnormality of a power transmission apparatus to be detected.

The present disclosure was made focusing on such a problem and has as its object to detect an abnormality in a power transmission apparatus.

To solve such a problem, an abnormality judgment apparatus according to one aspect of the present disclosure comprises: a processor; a communicating device configured to communicate with a mobile object provided with a power reception apparatus receiving power wirelessly transmitted from a power transmission apparatus installed on a road; and a storage device configured to store power reception history information received from the mobile object. The power reception history information is information including a power reception location of received power received by the power reception apparatus and the received power or the power transfer efficiency calculated based on the received power. The processor is configured to: calculate a probability of occurrence of an abnormality in the power reception apparatus of the mobile object based on the power reception history information and detect a presence of an abnormality occurring location where the power transfer efficiency becomes less than a predetermined value; and judge that an abnormality has occurred in the power transmission apparatus installed at the abnormality occurring location when an abnormality occurring location is detected and the probability becomes less than a predetermined judgment threshold value.

Further, the abnormality judgment apparatus according to another aspect of the present disclosure comprises: a processor; a communicating device configured to communicate with a mobile object provided with a power reception apparatus receiving power wirelessly transmitted from a power transmission apparatus installed on a road; and a storage device configured to store power reception history information received from the mobile object. The power reception history information is information including a power reception location of received power received by the power reception apparatus and the received power or the power transfer efficiency calculated based on the received power. The processor is configured to: detect a presence of an abnormality of the power reception apparatus of the mobile object based on the power reception history information and detect a presence of an abnormality occurring location where the power transfer efficiency becomes less than a predetermined value; and judge that an abnormality has occurred in the power transmission apparatus installed at the abnormality occurring location when an abnormality occurring location is detected and abnormality of the power reception apparatus is not detected.

Further, the abnormality judgment system according to one aspect of the present disclosure comprises: a power transmission apparatus installed on a road; and a mobile object provided with a power reception apparatus receiving power wireless transmitted from the power transmission apparatus. The abnormality judgment system is configured to: calculate a probability of occurrence of an abnormality in the power reception apparatus based on the power reception history information of the mobile object including a power reception location of received power received by the power reception apparatus and the received power or the power transfer efficiency calculated based on the received power and detect a presence of an abnormality occurring location where the power transfer efficiency becomes less than a predetermined value; and judge that an abnormality has occurred in the power transmission apparatus installed at the abnormality occurring location when an abnormality occurring location is detected and the probability becomes less than a predetermined judgment threshold value.

Further, the mobile object according to one aspect of the present disclosure comprises a power reception apparatus receiving power wirelessly transmitted from a power transmission apparatus installed on a road and is configured to collect power reception history information including a power reception location of received power received by the power reception apparatus and the received power or the power transfer efficiency calculated based on the received power, calculate a probability of occurrence of an abnormality in the power reception apparatus of the mobile based on the collected power reception history information and detect a presence of an abnormality occurring location where the power transfer efficiency becomes less than a predetermined value, and judge that an abnormality has occurred in the power transmission apparatus installed at the abnormality occurring location when an abnormality occurring location is detected and the probability becomes less than a predetermined judgment threshold value.

Further, an abnormality judgment method for judging an abnormality of a power transmission apparatus installed on a road according to one aspect of the present disclosure comprises: communicating with a mobile provided with a power reception apparatus receiving power wirelessly transmitted from the power transmission apparatus to thereby collect power reception history information including a power reception location of received power received by the power reception apparatus and the received power or the power transfer efficiency calculated based on the received power; calculating a probability of occurrence of an abnormality in the power reception apparatus of the mobile based on the collected power reception history information and detecting a presence of an abnormality occurring location where the power transfer efficiency becomes less than a predetermined value; and judging that an abnormality has occurred in the power transmission apparatus installed at the abnormality occurring location when an abnormality occurring location is detected and the probability becomes less than a predetermined judgment threshold value.

According to these aspects of the present disclosure, it is possible to utilize the property that if the possibility of occurrence of an abnormality in a power reception apparatus is low, the possibility of occurrence of an abnormality in a power transmission apparatus is high so as to detect an abnormality in a power transmission apparatus.

DESCRIPTION OF DRAWINGS

Figure 1:
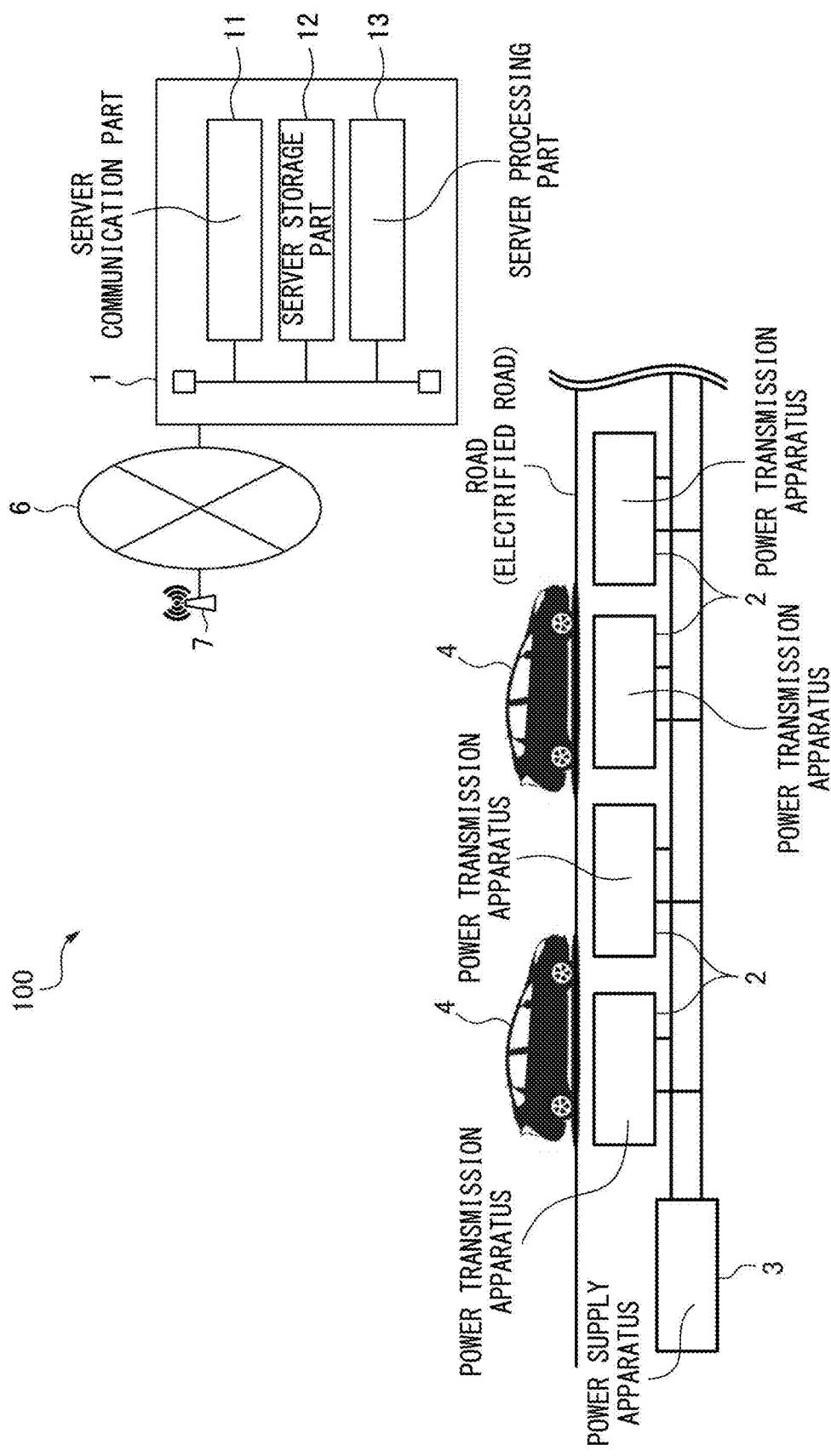
FIG. 1 is a schematic view of the configuration of a dynamic wireless power transfer system according to one embodiment of the present disclosure.

Below, referring to the drawings, embodiments of the present disclosure will be explained in detail. Note that, in the following explanation, similar component elements will be assigned the same reference notations.

FIG. 1 is a schematic view of the configuration of a dynamic wireless power transfer system 100 according to one embodiment of the present disclosure.

The dynamic wireless power transfer system 100 according to the present embodiment is provided with a server 1, a plurality of power transmission apparatuses 2 installed consecutively along a road at predetermined intervals, a power supply apparatus 3 for supplying power to the power transmission apparatuses 2, and a plurality of vehicles 4 in which power reception apparatuses 5 (see FIG. 2) are mounted for receiving power wirelessly transmitted from the power transmission apparatuses 2. The vehicles 4 may be electric vehicles, may be hybrid vehicles, or may be so-called engine vehicles. The type is not particularly limited. Note that, in the following explanation, a road in which power transmission apparatuses 2 are installed will be referred to as an "electrified road" in accordance with need.

The server 1 is provided with a server communicating part 11, server storage part 12, and server processing part 13.

The server communicating part 11 has a communication interface circuit for connecting the server 1 through, for example, a gateway etc. to a network 6 and is configured to be enable communication with the vehicle 4.

The server storage part 12 has an HDD (hard disk drive) or optical recording medium, semiconductor memory, or other storage medium and stores various types of computer programs or data etc. used for processing at the server processing part 13.

The server processing part 13 has one or more CPU (central processing units) and their peripheral circuits. The server processing part 13 runs various types of computer programs stored in the server storage part 12 and controls overall the operations of the server 1 as a whole. For example, it is a processor. The processing performed by the server processing part 13 and in turn the server 1 will be explained referring to FIG. 3 to FIG. 6.

Figure 2:
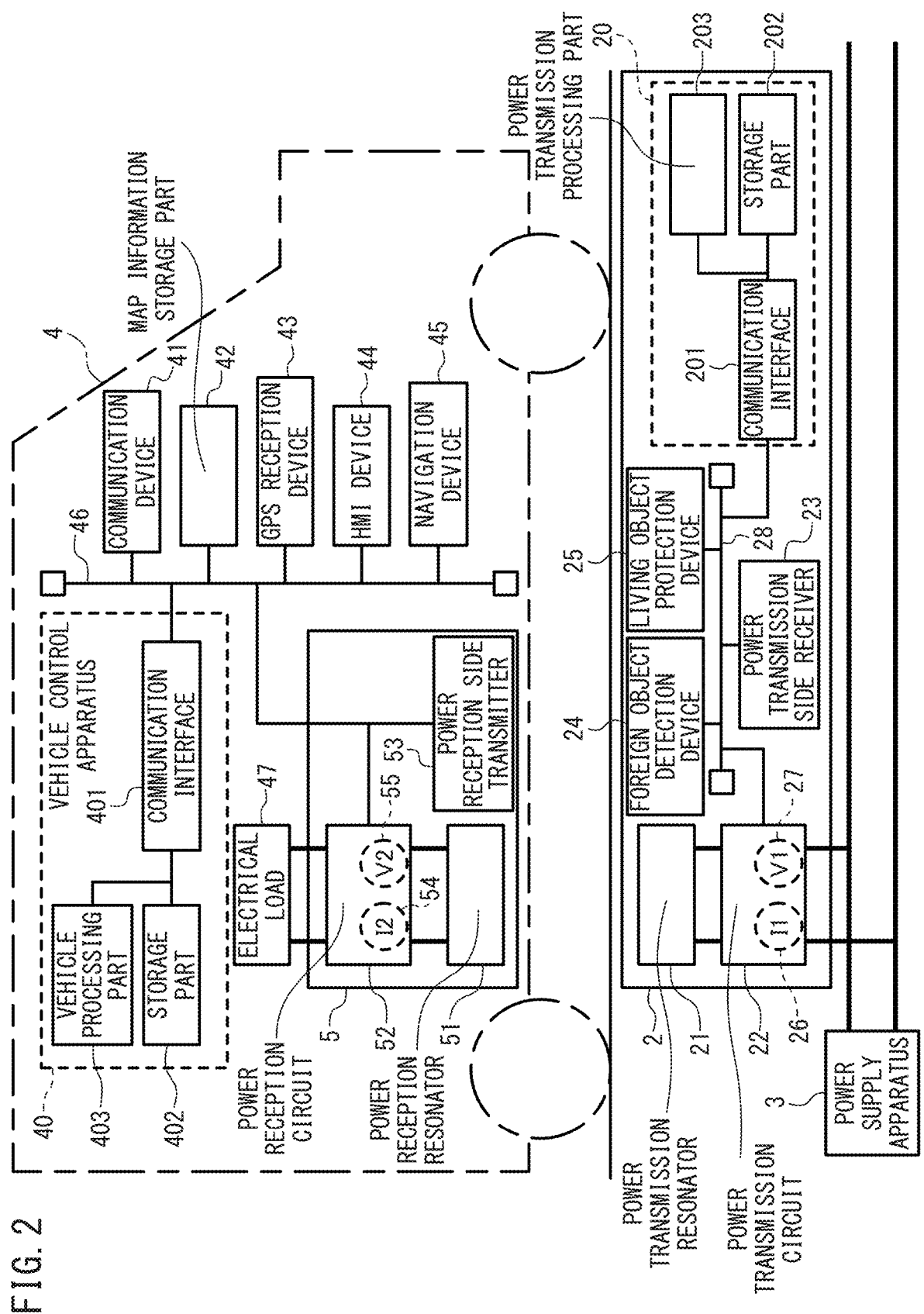
FIG. 2 is a view explaining the detailed configurations of a power transmission apparatus and a vehicle according to an embodiment of the present disclosure.

FIG. 2 is a view explaining the detailed configurations of a power transmission apparatus 2 and a vehicle 4 according to an embodiment of the present disclosure.

The power transmission apparatus 2 is provided with a power transmission resonator 21, a power transmission circuit 22, a power transmission side receiver 23, a foreign object detection device 24, a living object protection device 25, and a power transmission control device 20. The power transmission circuit 22, power transmission side receiver 23, foreign object detection device 24, and living object protection device 25 are connected with the power transmission control device 20 through an internal network 28 in the power transmission apparatus 2 based on the CAN (Controller Area Network) or other standard.

The power transmission resonator 21 is a resonance circuit including a power transmission coil and is configured to resonate at a predetermined resonance frequency $f_0$. The vehicle 4 is provided with a power reception resonator 51 corresponding to this power transmission resonator 21. The power reception resonator 51 is a resonance circuit including a power reception coil and is configured to resonate by the same resonance frequency $f_0$ as the power transmission resonator 21. By making the power transmission resonator 21 resonate, a spatially separately arranged power transmission coil of the power transmission resonator 21 and power reception coil of the power reception resonator 51 are magnetically coupled and power is transferred (wirelessly supplied) from the power transmission apparatus 2 to the power reception apparatus 5.

The power transmission circuit 22 is an electrical circuit provided with an inverter and is configured to convert DC power supplied from the power supply apparatus 3 to the desired AC power and supply it to the power transmission resonator 21 based on a control signal from the power transmission control device 20. The power transmission circuit 22 is provided with a power transmission side current sensor 26 for detecting a current I1 flowing through the power transmission resonator 21 (below, referred to as the "power transmission side current") and a power transmission side voltage sensor 27 for detecting a voltage V1 applied to the power transmission resonator 21 (below, referred to as the "power transmission side voltage"). The power transmission side current I1 and the power transmission side voltage V1 detected by the sensors 26 and 27 are respectively input to the power transmission control device 20.

The power transmission side receiver 23 utilizes a predetermined wireless communication line to wirelessly communicate with a power reception side transmitter 53 mounted in each vehicle 4 and receives a proximity signal sent from the power reception side transmitter 53. A proximity signal is a signal for notifying the approach of the vehicle 4 to a power transmission apparatus 2 and a signal for prompting the power transmission apparatus 2 receiving the proximity signal to prepare for transfer of power.

The foreign object detection device 24 detects metal foreign objects present on the road between the power transmission apparatus 2 and power reception apparatus 5. This is because if power is transferred from the power transmission apparatus 2 to the power reception apparatus 5 in a state where there is a metal foreign object present in the space between the power transmission apparatus 2 and the power reception apparatus 5, the metal foreign object is liable to be heated and the power transfer efficiency is liable to fall. The foreign object detection device 24 sends foreign object detection information on whether there is a metal foreign object present to the power transmission control device 20 in response to a request from the power transmission control device 20. The method of detection of a metal foreign object by the foreign object detection device 24 is not particularly limited. For example, detection by a metal detector or other various known techniques can be used.

The living object protection device 25 detects any living object (for example, a human being or animal etc.) present in the surroundings of the power transmission apparatus 2. This is because if the power transmission apparatus 2 is driven in a state where there is a living object present in the surroundings of the power transmission apparatus 2, the living body will be exposed to the magnetic field leaked from the power transmission apparatus 2 and is liable to be affected in health. The living object protection device 25 sends living object detection information on whether there is a living object present to the power transmission control device 20 in response to a request from the power transmission control device 20. The method of detection of a living object by the living object detection device 25 is not particularly limited. For example, image recognition or other various known techniques can be used.

The power transmission control device 20 is provided with a communication interface 201, storage part 202, and power transmission processing part 203.

The communication interface 201 is a communication interface circuit for connecting the power transmission control device 20 to the internal network 28 in the power transmission apparatus 2.

The storage part 202 has an HDD or optical recording medium, semiconductor memory, or other storage medium and stores various computer programs or data etc. used for processing in the power transmission processing part 203.

The power transmission processing part 203 has one or more processors and their peripheral circuits. The power transmission processing part 203 runs various computer programs stored in the storage part 202 to comprehensively control the power transmission apparatus 2 and is, for example, a CPU.

If for example receiving a proximity signal through the power transmission side receiver 23, the power transmission processing part 203 and in turn the power transmission control device 20 drive the foreign object detection device 24 and living object protection device 25 to acquire foreign object detection information and living object detection information. Further, if the presence of at least one of a metal foreign object or living object is confirmed, the power transmission control device 20 controls the power transmission circuit 22 so that power is not transferred from the power transmission apparatus 2 to the power reception apparatus 5. On the other hand, if the presence of a metal foreign object and living object is not confirmed, the power transmission control device 20 controls the power transmission circuit 22 so that the transmitted power P1 [W] becomes a predetermined target power transmission power $P1_{tgt}$.

In the present embodiment, the target power transmission power $P1_{tgt}$ is made a preset fixed value, but, for example, if the proximity signal is made to include information relating to the demanded received power of the sending vehicle 4 of the proximity signal, the target power transmission power $P1_{tgt}$ may also be set to the demanded received power.

Note that the power transmission side current I1 is correlated with an engagement coefficient "k" showing a degree of magnetic engagement between a power transmission coil of a power transmission resonator 21 and a power reception coil of a power reception resonator 51. The smaller the engagement coefficient "k", the larger it becomes. Therefore, for example, by monitoring the power transmission side current I1 after receiving the proximity signal, it is possible to judge approach and separation of the vehicle 4 with respect to the power transmission apparatus 2 and possible to start or end control with respect to the power transmission circuit 22 in accordance with that judgment.

The vehicle 4 is provided with a communication device 41, map information storage device 42, GPS reception device 43, HMI device 44, navigation device 45, power reception apparatus 5, and vehicle control device 40. The communication device 41, map information storage device 42, GPS reception device 43, HMI device 44, navigation device 45, and power reception apparatus 5 are connected with the vehicle control device 40 through an internal vehicle network 46 based on the CAN or other standard.

The communication device 41 is a vehicle-mounted terminal having a wireless communication function. The communication device 41 accesses a wireless base station 7 (see FIG. 1) connected with a network 6 (see FIG. 1) through a not shown gateway etc. so as to be connected with the network 6 through the wireless base station 7. Due to this, the vehicle 4 and the server 1 communicate with each other.

The map information storage device 42 stores map information including positional information of the road or information relating to the type of the road (for example, information of whether the road is an electrified road etc.)

The GPS reception device 43 receives signals from satellites to identify the latitude and longitude of the host vehicle 4 and detect the current position of the host vehicle 4. The GPS reception device 43 sends the detected current position information of the host vehicle 4 to the vehicle control device 40.

The HMI device 44 is an interface for transfer of information with a vehicle occupant. The HMI device 44 according to the present embodiment is provided with a display or speaker for providing various information to the vehicle occupants and a touch panel (or operating buttons) for the vehicle occupants to input information. The HMI device 44 sends input information input by the vehicle occupants to various devices requiring that input information (for example, a navigation device if the input information is the destination) and displays the information received through the internal vehicle network 46 on the display to provide it to the vehicle occupants.

The navigation device 45 is a device for guiding the vehicle 4 to a destination set by the vehicle occupants through the HMI device 44. For example, the navigation device 45 sets a driving route to the destination based on the current position information of the host vehicle 4 and map information and sends the information relating to the set driving route as navigation information to the vehicle control device 40 or HMI device 44 etc.

The power reception apparatus 5 is provided with a power reception resonator 51, power reception circuit 52, and power reception side transmitter 53.

The power reception resonator 51, as explained above, is a resonance circuit including a power reception coil and is configured to resonate at the same resonance frequency $f_0$ as the power transmission resonator 21.

The power reception circuit 52 is an electrical circuit provided with a rectifier and DC/DC converter and is configured to be able to convert AC power output from the power reception resonator 51 by the rectifier to DC power and supply it through the DC/DC converter to an electrical load 47. As the electrical load 47, for example, a battery, motor, etc. may be mentioned, but it is not particularly limited. In the present embodiment, the power reception circuit 52 is connected to a battery as the electrical load 47. The power reception circuit 52 is provided with a power reception side current sensor 54 for detecting an output current I2 of the rectifier (below, referred to as the "power reception side current") and a power reception side voltage sensor 55 for detecting an output voltage V2 of the rectifier (below, referred to as the "power reception side voltage"). The power reception side current I2 and power reception side voltage V2 detected by the sensors 54 and 55 are respectively input to the vehicle control device 40.

The power reception side transmitter 53 utilizes a predetermined wireless communication line to wirelessly communicate with the power transmission side receiver 23 of each power transmission apparatus 2 and sends the above-mentioned proximity signal to each power transmission apparatus 2.

The vehicle control device 40 is provided with a communication interface 401, storage part 402, and vehicle processing part 403.

The communication interface 401 is a communication interface circuit for connecting the vehicle control device 40 to the internal vehicle network 46.

The storage part 402 has an HDD or optical recording medium, semiconductor memory, or other storage medium and stores various computer programs or data etc. used for processing in the vehicle processing part 403.

The vehicle processing part 403 has one or more processors and their peripheral circuits. The vehicle processing part 403 runs various types of computer programs stored in the storage part 402 and controls overall the vehicle 4. For example, it is a CPU.

If detecting for example that the host vehicle 4 is approaching an electrified road, the vehicle processing part 403 and in turn the vehicle control device 40 start to send the proximity signal through the power reception side transmitter 53 and controls the power reception circuit 52 (DC/DC converter) to control the power reception voltage V2 to a target power reception voltage $V2_{tgt}$. This is because the power transfer efficiency η between the resonators is correlated with the power reception voltage V2. In the present embodiment, the target power reception voltage $V2_{tgt}$ is set to a predetermined voltage value by which the desired power transfer efficiency $\eta_{tgt}$ is obtained.

Note that the method for detecting the approach to an electrified road is not particularly limited. For example, it may be detected based on the current position information of the vehicle 4 and navigation information (driving route) or, if infrastructure installed before the electrified road sends a signal notifying that an electrified road will be passed through to passing vehicles 4, may be detected by receiving that signal.

In this regard, if an abnormality occurs in the transfer of power from a power transmission apparatus 2 to a power reception apparatus 5, since the power transmission apparatus 2 and the power reception apparatus 5 are physically separated, the dynamic wireless power transfer system 100 has to judge if the cause of the abnormality lies in the power transmission apparatus 2 or lies in the power reception apparatus 5. In particular, an abnormality of a power transmission apparatus 2 affects all of the vehicles 4 running on the electrified road on which that power transmission apparatus 2 is installed. That is, if an abnormality occurs in a power transmission apparatus 2, the effect reaches a broad range. For this reason, it is desired to be able to detect an abnormality of a power transmission apparatus 2.

Therefore, in the present embodiment, the probability X of occurrence of an abnormality in a power reception apparatus 5 mounted in a vehicle 4 (below, "the abnormality probability") is calculated based on the power reception history information of the vehicle 4, the presence of an abnormality occurring location where the real power transfer efficiency $\eta_{real}$ from the power transmission apparatus 2 to the power reception apparatus 5 has become less than a predetermined value η1 is detected, and, when an abnormality occurring location is detected and the abnormality probability X is less than a predetermined value X1, it is judged that an abnormality has occurred at the power transmission apparatus 2 installed at the abnormality occurring location. In the present embodiment, the power reception history information of the vehicle 4 is the information of the real power transfer efficiency $\eta_{real}$ calculated based on the received power P2 [W] received by the power reception apparatus 5 while running on the electrified road, the positional information of the location where that power transfer efficiency $\eta_{real}$ was obtained (that is, the power reception location of the received power P2), and identification information of the host vehicle linked together.

Below, the abnormality detection control of the power transmission apparatus 2 according to the present embodiment will be explained.

Figure 3:
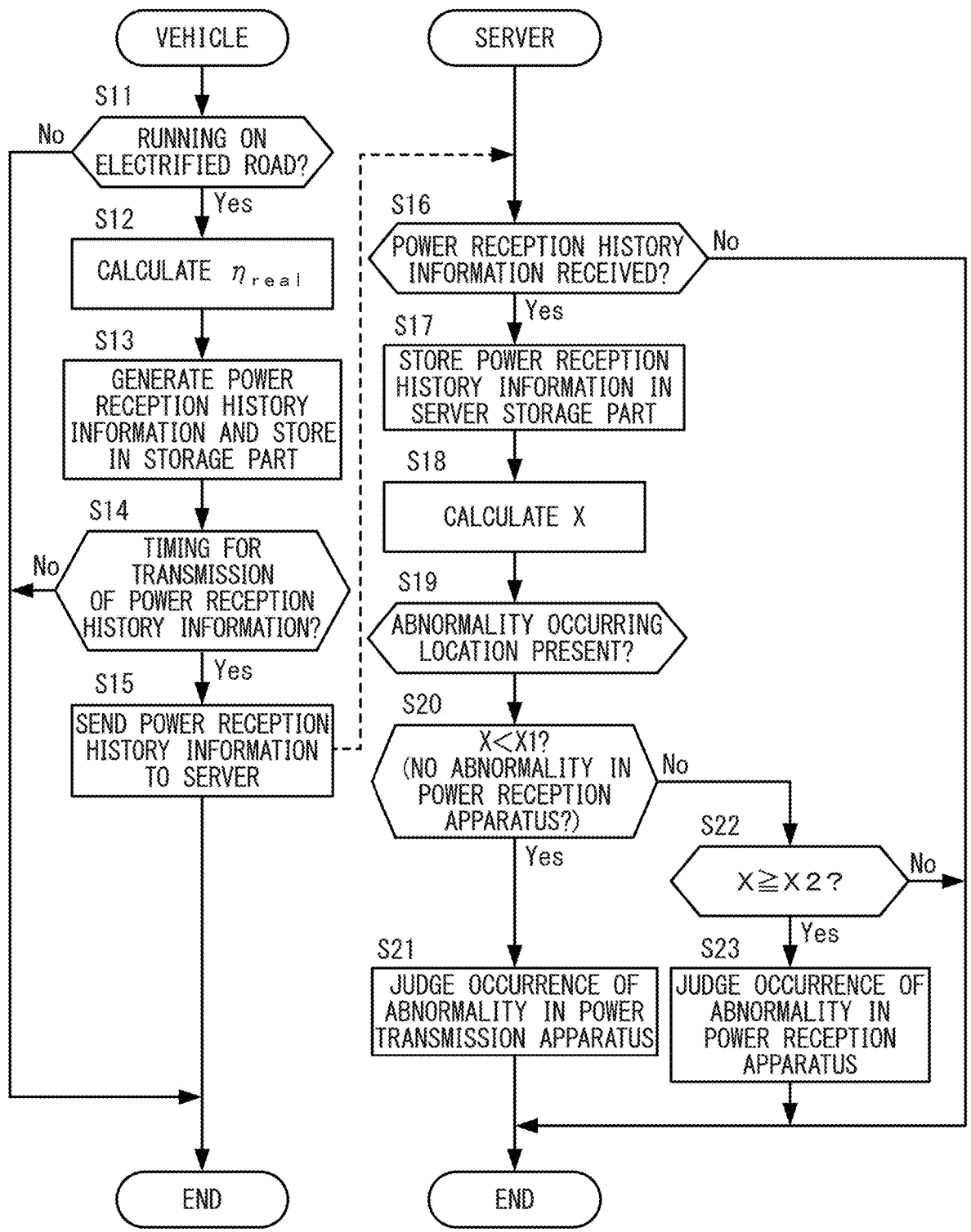
FIG. 3 is a flow chart for explaining the content of processing performed between a vehicle and a server for detecting an abnormality of a power transmission apparatus.

FIG. 3 is a flow chart for explaining the content of processing performed between a vehicle 4 and a server 1 for detecting an abnormality of a power transmission apparatus 2. The vehicle 4 and the server 1 repeatedly perform the present routine at predetermined processing intervals.

At step S11, the vehicle control device 40 of the vehicle 4 judges if the host vehicle is running on an electrified road based on the current position information of the host vehicle and map information. If the host vehicle is running on an electrified road, the vehicle control device 40 of the vehicle 4 proceeds to the processing of step S12. On the other hand, if the host vehicle is not running on an electrified road, the vehicle control device 40 of the vehicle 4 ends the current processing.

At step S12, the vehicle control device 40 of the vehicle 4 calculates the received power P2 received by the power reception apparatus 5 based on the power reception current I2 and the power reception voltage V2 and divides this by the target power transmission power $P1_{tgt}$ to calculate the power transfer efficiency $\eta_{real}$ $(=P2/P1_{tgt})$.

Note that if the value of the target power transmission power $P1_{tgt}$ is made a fixed value, the value of the target power transmission power $P1_{tgt}$ can be acquired by storing it in the storage part 402 of the vehicle control device 40 of each vehicle 4 like in the present embodiment. Further, for example, the vehicle control device 40 of each vehicle 4 can calculate the demanded received power based on the state of the electrical load 47 (for example, if the electrical load 47 is a battery, the state of charge of the battery) and, if the proximity signal is made to include information relating to the demanded received power, to make the demanded received power the target power transmission power $P1_{tgt}$.

At step S13, the vehicle control device 40 of the vehicle 4 generates power reception history information linking the power transfer efficiency $\eta_{real}$, the positional information of the location where that power transfer efficiency $\eta_{real}$ was obtained (that is, the power reception location of the received power P2 and the current position information of the vehicle 4 when acquiring the power reception current I2 and the power reception voltage V2 used for calculation of the power transfer efficiency $\eta_{real}$), and identification information of the host vehicle and stores it in the storage part 402.

At step S14, the vehicle control device 40 of the vehicle 4 judges if it is the timing for sending the power reception history information stored in the storage part 402. The timing of transmission is, for example, when the amount of the power reception history information stored in the storage part 402 is greater than or equal to a predetermined amount, when one trip has ended, etc. In the present embodiment, if the amount of the power reception history information stored in the storage part 402 is greater than or equal to a predetermined amount, the vehicle control device 40 of the vehicle 4 judges that it is the timing for sending the power reception history information and proceeds to the processing of step S15. On the other hand, if the amount of the power reception history information is less than a predetermined amount, the vehicle control device 40 of the vehicle 4 ends the current processing.

At step S15, the vehicle control device 40 of the vehicle 4 sends all of the power reception history information stored in the storage part 402 in the server 1 and deletes the sent power reception history information from the storage part 402.

At step S16, the server 1 judges if it has received power reception history information from the vehicle 4. If it has received power reception history information from the vehicle 4, the server 1 proceeds to the processing of step S17. On the other hand, if it has not received power reception history information from the vehicle 4, the server 1 ends the current processing.

At step S17, the server 1 separates the power reception history information received from the vehicles 4 for each vehicle and stores it in the server storage part 12. In this way, the server 1 stores the power reception history information of each vehicle 4 separately for each vehicle.

At step S18, the server 1 calculates the probability of occurrence of an abnormality in the power reception apparatus 5 mounted in the vehicle 4 sending the power reception history information at step S15 stored at the server storage part 12 (below, referred to as the "sending vehicle"), that is, the abnormality probability X, based on the power reception history information of the sending vehicle 4. In the present embodiment, the server 1 calculates the average value $\eta_{av}$ of the power transfer efficiency $\eta_{real}$ of the sending vehicle 4 of a certain number of minutes or a certain number of days in the recent past based on the power reception history information of the sending vehicle 4 and refers to the map shown in FIG. 4 prepared in advance by experiments etc. to calculate the abnormality probability X based on the calculated average value $\eta_{av}$.

Figure 4:
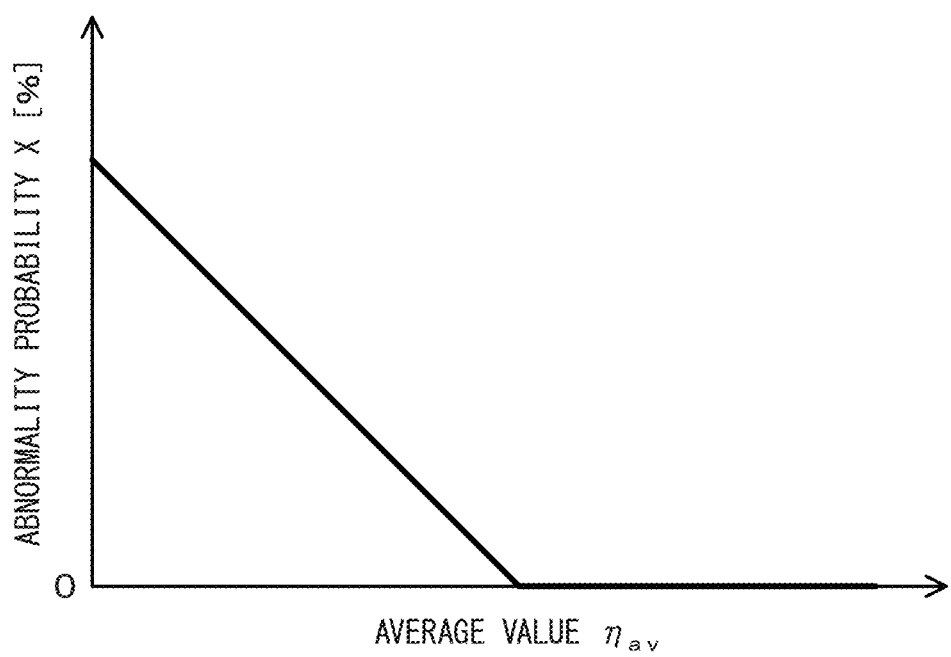
FIG. 4 is one example of a map for calculating an abnormality probability X based on an average value $\eta_{av}$ of power transmission efficiencies in the recent past.

As shown in the map of FIG. 4, the abnormality probability X is basically set to a lower value when the average value $\eta_{av}$ of the power transfer efficiency $\eta_{real}$ in the recent past is high than when it is low. In the present embodiment, the abnormality probability X gradually decreases toward 0[%] as the average value $\eta_{av}$ becomes higher in the range where the average value $\eta_{av}$ of the power transfer efficiency $\eta_{real}$ in the recent past is less than a certain predetermined value and is made 0[%] in the range where it is greater than or equal to the predetermined value.

In this way, the higher the average value $\eta_{av}$ of the power transfer efficiency $\eta_{real}$ of the sending vehicle 4 in the recent past, basically the lower the probability of occurrence of an abnormality in the power reception apparatus 5 mounted in the sending vehicle 4 (abnormality probability X).

This is because if the average value $\eta_{av}$ of the power transfer efficiency $\eta_{real}$ of the sending vehicle 4 in the recent past is high, it is considered that the power transfer efficiency $\eta_{real}$ will continue to be high as a result of the power reception apparatus 5 normally receiving power. On the other hand, if the average value $\eta_{av}$ of the power transfer efficiency $\eta_{real}$ of the sending vehicle 4 in the recent past is low, it is considered that the power transfer efficiency $\eta_{real}$ will continue to be low. Therefore, the possibility of occurrence of an abnormality in the power reception apparatus 5 of that sending vehicle 4 is high.

At step S19, the server 1 judges if there is a location where the power transfer efficiency $\eta_{real}$ becomes less than a predetermined value $\eta 1$ ($<\eta_{tgt}$), that is, an abnormality occurring location where there is a possibility of power not being transferred normally, based on the power reception history information of the sending vehicle 4 stored in the server storage part 12. If there is an abnormality occurring location, the server 1 proceeds to the processing of step S20. On the other hand, if there is no abnormality occurring location, the server 1 ends the current processing.

At step S20, the server 1 judges if there is no abnormality in power reception apparatus of the sending vehicle 4. In the present embodiment, the server 1 judges if the abnormality probability X is less than a predetermined first judgment threshold value X1 and, if the abnormality probability X is less than the first judgment threshold value X1, since the probability of occurrence of an abnormality at the power reception apparatus 5 of the sending vehicle 4 is low, judges that there is no abnormality in the power reception apparatus of the sending vehicle 4. On the other hand, if the abnormality probability X is greater than or equal to the first judgment threshold value X1, the server 1 judges that it is unclear if there is any abnormality in the power reception apparatus 5 of the sending vehicle 4 and proceeds to the processing of step S22.

At step S21, if, regardless of the abnormality probability X being less than the abnormality judgment threshold value X1, that is, regardless of the probability of occurrence of an abnormality at the power reception apparatus 5 of the sending vehicle 4 being low, at an abnormality occurring location where the power transfer efficiency $\eta_{real}$ becomes less than a predetermined value $\eta 1$ ($<\eta_{tgt}$), it can be judged that the possibility of occurrence of an abnormality at the power transmission apparatus 2 set for that abnormality occurring location is high, the server 1 judges that an abnormality has occurred in the power transmission apparatus 2 installed at the abnormality occurring location identified at step S19.

At step S22, the server 1 judges if the abnormality probability X is greater than or equal to a predetermined second judgment threshold value X2. The second judgment threshold value X2 is a value larger than the first judgment threshold value X1. If the abnormality probability X is greater than or equal to the second judgment threshold value X2, the server 1 proceeds to the processing of step S23. On the other hand, if the abnormality probability X is less than the second judgment threshold value X2, the server 1 judges that accurate judgment of whether an abnormality has occurred in the power transmission apparatus 2 or whether an abnormality has occurred in the power reception apparatus 5 is difficult and ends the current processing.

At step S23, if an abnormality occurring location where the abnormality probability X is greater than or equal to a predetermined second judgment threshold value X2 and the power transfer efficiency $\eta_{real}$ is less than a predetermined value $\eta 1$ is detected, the server 1 judges that the possibility of occurrence of an abnormality in the power reception apparatus 5 of the sending vehicle 4 is high and judges that an abnormality has occurred in the power reception apparatus 5 of the sending vehicle 4. In this case, the server 1 may also be made to send a signal to the sending vehicle 4 notifying it that an abnormality has occurred in the power reception apparatus 5. At this time, at the sending vehicle 4 side, it is also possible to notify the vehicle occupants of the occurrence of an abnormality in the power reception apparatus 5 of the host vehicle through the HMI device 44.

Note that in the present embodiment, information linking the power transfer efficiency $\eta_{real}$ calculated based on the received power P2, the positional information of the location where that power transfer efficiency $\eta_{real}$ was obtained, and identification information of the host vehicle was sent as power reception history information from each vehicle 4 to the server 1. However, information linking the received power P2, the positional information of the location where that received power P2 was obtained, and identification information of the host vehicle may also be sent as power reception history information from each vehicle 4 to the server 1 and the received power may be converted to the power transfer efficiency $\eta_{real}$ at the server 1. That is, in the present embodiment, the power reception history information may be information including the received power P2 received by the power reception apparatus 5 and its power reception location.

The server 1 (abnormality judgment apparatus) according to the present embodiment explained above is provided with a server processing part 13 (processor), a server communicating part 11 (communicating device) able to communicate with a vehicle 4 (mobile object) provided with a power reception apparatus 5 receiving power wirelessly transmitted from a power transmission apparatus 2 installed on a road, and a server storage part 12 (storage device) storing power reception history information received from the vehicle 4. The power reception history information is information including a power reception location of received power P2 received by the power reception apparatus 5 and the received power P2 or the power transfer efficiency $\eta_{real}$ calculated based on the received power P2. Further, the server processing part 13 is configured to calculate an abnormality probability X of occurrence of an abnormality in the power reception apparatus 5 of the vehicle 4 based on the power reception history information and detect the presence of an abnormality occurring location where the power transfer efficiency $\eta_{real}$ becomes less than a predetermined value $\eta 1$ and to judge occurrence of an abnormality in the power transmission apparatus 2 installed at the abnormality occurring location if an abnormality occurring location is detected and when the abnormality probability X is less than the first judgment threshold value X1. Alternatively, the server processing part 13 is configured to detect the presence of an abnormality in the power reception apparatus 5 of the vehicle 4 based on the power reception history information and detect the presence of an abnormality occurring location where the power transfer efficiency $\eta_{real}$ becomes less than a predetermined value $\eta 1$ and, if an abnormality occurring location is detected and an abnormality of the power reception apparatus 5 is not detected, judges that an abnormality has occurred in the power transmission apparatus 2 installed at the abnormality occurring location.

In this way, according to the present embodiment, if an abnormality occurs in power transfer from a power transmission apparatus 2 to a power reception apparatus 5, that is, if an abnormality occurring location where a power transfer efficiency $\eta_{real}$ becomes less than a predetermined value $\eta 1$ is detected, it is possible to confirm that the probability of occurrence of an abnormality in the power reception apparatus 5 of the vehicle 4 (abnormality probability X) is low or that an abnormality in the power reception apparatus 5 of the vehicle 4 has not occurred. Therefore, if the possibility of occurrence of an abnormality in the power reception apparatus 5 is low, it is possible to utilize the property of the high possibility of occurrence of an abnormality in the power transmission apparatus 2 to detect an abnormality of the power transmission apparatus 2.

Further, the server processing part 13 according to the present embodiment is configured to calculate the abnormality probability X based on the power transfer efficiency $\eta_{real}$ over a certain time period in the past (for example, the power transfer efficiency $\eta_{real}$ over a certain number of minutes or a certain number of days in the recent past). More specifically, it is configured to lower the abnormality probability X when the power transfer efficiency $\eta_{real}$ of a certain period in the past is high compared to when it is low.

When the power transfer efficiency $\eta_{real}$ of a certain period in the past is high, it is considered that the power transfer efficiency $\eta_{real}$ will continue to be high as a result of the ability of the power reception apparatus 5 to normally receive power. On the other hand, when the power transfer efficiency $\eta_{real}$ of a certain period in the past is low, it is considered that the power transfer efficiency $\eta_{real}$ will continue to be low as a result of an abnormality occurring in the power reception apparatus 5 and it no longer being able to normally receive power. Therefore, by investigating the power transfer efficiency $\eta_{real}$ over a certain period in the past, it is possible to judge if a power reception apparatus 5 can continue to normally receive power and precisely calculate the abnormality probability X of the power reception apparatus 5 and in turn precisely detect abnormality of the power transmission apparatus 2.

Further, the dynamic wireless power transfer system 100 according to the present embodiment (abnormality judgment system) is provided with a power transmission apparatus 2 installed on a road and a vehicle 4 (mobile object) provided with a power reception apparatus 5 for receiving power wirelessly transmitted from the power transmission apparatus 2 and is configured to calculate a probability of occurrence of an abnormality in the power reception apparatus 5 based on the power reception history information of the vehicle 4 including a power reception location of received power received by the power reception apparatus 5 and the received power or the power transfer efficiency $\eta_{real}$ calculated based on the received power and detect a presence of an abnormality occurring location where the power transfer efficiency $\eta_{real}$ becomes less than a predetermined value $\eta 1$ and to judge that an abnormality has occurred in the power transmission apparatus 2 installed at the abnormality occurring location in that case. Due to this configuration, it is possible to utilize the property that if the possibility of occurrence of an abnormality in a power reception apparatus 5 is low, the possibility of occurrence of an abnormality in a power transmission apparatus 2 is high, so as to detect an abnormality in a power transmission apparatus 2.

Further, the processing performed at the server 1 according to the present embodiment includes a step of communicating with a vehicle 4 (mobile object) provided with a power reception apparatus 5 receiving power wirelessly transmitted from a power transmission apparatus 2 to thereby collect power reception history information including a power reception location of received power received by the power reception apparatus 5 and the received power or the power transfer efficiency $\eta_{real}$ calculated based on the received power, a step of calculating an abnormality probability X of occurrence of an abnormality in the power reception apparatus 5 of the vehicle 4 based on the collected power reception history information and detecting a presence of an abnormality occurring location where the power transfer efficiency $\eta_{real}$ becomes less than a predetermined value $\eta 1$, and a step of judging that an abnormality has occurred in the power transmission apparatus 2 installed at the abnormality occurring location when an abnormality occurring location is detected and the abnormality probability X becomes less than a first judgment threshold value X1. Due to this, it is possible to utilize the property that if the possibility of occurrence of an abnormality in a power reception apparatus 5 is low, the possibility of occurrence of an abnormality in a power transmission apparatus 2 is high, so as to detect an abnormality in a power transmission apparatus 2.

Above, embodiments according to the present disclosure were explained, but the embodiments only show part of the examples of application of the present disclosure. They are not meant to limit the technical scope of present disclosure to the specific constitutions of the embodiments.

For example, in the above embodiments, the processing of step S16 to step S22 which had been performed by the server 1 may also be performed by the vehicle control device 40 of the vehicle 4. That is, a vehicle 4 (mobile object) provided with a power reception apparatus 5 for receiving the power wirelessly transmitted from the power transmission apparatus 2 installed on the road may be configured to collect power reception history information including the power reception location of the received power received by the power reception apparatus 5 and the received power or the power transfer efficiency $\eta_{real}$ calculated based on the received power, to calculate the abnormality probability X of occurrence of an abnormality in the power reception apparatus 5 based on the collected power reception history information and detect presence of an abnormality occurring location at which the power transfer efficiency $\eta_{real}$ becomes less than a predetermined value $\eta 1$, and, if an abnormality occurring location is detected and when the abnormality probability X becomes less than the predetermined judgment threshold value X1, judge that an abnormality has occurred in the power transmission apparatus 2 installed at the abnormality occurring location.

Further, in the above embodiments, each power transmission apparatus 2 was provided with a power transmission control device 20, but a single power transmission control device 20 may also be used to control a plurality of power transmission apparatuses 2.

The invention claimed is:

1. An abnormality judgment apparatus comprising:
   a processor;
   a communicating device configured to communicate with a mobile object provided with a power reception apparatus receiving power wirelessly transmitted from a power transmission apparatus installed on a road; and
   a storage device configured to store power reception history information received from the mobile object, wherein
   the power reception history information is information including a power reception location of received power received by the power reception apparatus and the received power or the power transfer efficiency calculated based on the received power, and
   the processor is configured to:
      calculate a probability of occurrence of an abnormality in the power reception apparatus of the mobile object based on the power reception history information and detect a presence of an abnormality occurring location where the power transfer efficiency becomes less than a predetermined value; and
      judge that an abnormality has occurred in the power transmission apparatus installed at the abnormality occurring location when an abnormality occurring location is detected and the probability becomes less than a predetermined judgment threshold value.

2. The abnormality judgment apparatus according to claim 1, wherein
   the processor is configured to calculate the probability based on the power transfer efficiency over a certain time period in the past.

3. The abnormality judgment apparatus according to claim 1, wherein
   the processor is configured to lower the probability more when the power transfer efficiency over a certain time period in the past is high compared to when it is low.

4. An abnormality judgment apparatus comprising:
   a processor;
   a communicating device configured to communicate with a mobile object provided with a power reception apparatus receiving power wirelessly transmitted from a power transmission apparatus installed on a road; and
   a storage device configured to store power reception history information received from the mobile object, wherein
   the power reception history information is information including a power reception location of received power received by the power reception apparatus and the received power or the power transfer efficiency calculated based on the received power, and
   the processor is configured to:
      detect a presence of an abnormality of the power reception apparatus of the mobile object based on the power reception history information and detect a presence of an abnormality occurring location where the power transfer efficiency becomes less than a predetermined value; and
      judge that an abnormality has occurred in the power transmission apparatus installed at the abnormality occurring location when an abnormality occurring location is detected and abnormality of the power reception apparatus is not detected.

5. An abnormality judgment system of a power transmission apparatus comprising:
   the power transmission apparatus installed on a road; and
   a mobile object provided with a power reception apparatus receiving power wireless transmitted from the power transmission apparatus, wherein
   the abnormality judgment system is configured to:
      calculate a probability of occurrence of an abnormality in the power reception apparatus based on the power reception history information of the mobile object including a power reception location of received power received by the power reception apparatus and the received power or the power transfer efficiency calculated based on the received power and detect a presence of an abnormality occurring location where the power transfer efficiency becomes less than a predetermined value; and judge that an abnormality has occurred in the power transmission apparatus installed at the abnormality occurring location when an abnormality occurring location is detected and the probability becomes less than a predetermined judgment threshold value.

6. A mobile object provided with a power reception apparatus receiving power wirelessly transmitted from a power transmission apparatus installed on a road, wherein the mobile object is configured to:
    collect power reception history information including a power reception location of received power received by the power reception apparatus and the received power or the power transfer efficiency calculated based on the received power;
    calculate a probability of occurrence of an abnormality in the power reception apparatus of the mobile object based on the collected power reception history information and detect a presence of an abnormality occurring location where the power transfer efficiency becomes less than a predetermined value; and
    judge that an abnormality has occurred in the power transmission apparatus installed at the abnormality occurring location when an abnormality occurring location is detected and the probability becomes less than a predetermined judgment threshold value.

7. An abnormality judgment method for judging an abnormality of a power transmission apparatus installed on a road, wherein
    the abnormality judgment method comprising:
    communicating with a mobile object provided with a power reception apparatus receiving power wirelessly transmitted from the power transmission apparatus to thereby collect power reception history information including a power reception location of received power received by the power reception apparatus and the received power or the power transfer efficiency calculated based on the received power;
    calculating a probability of occurrence of an abnormality in the power reception apparatus of the mobile object based on the collected power reception history information and detecting a presence of an abnormality occurring location where the power transfer efficiency becomes less than a predetermined value; and
    judging that an abnormality has occurred in the power transmission apparatus installed at the abnormality occurring location when an abnormality occurring location is detected and the probability becomes less than a predetermined judgment threshold value.

* * * * *